Oct. 2, 1962  G. BRUN  3,056,355
HYDRAULIC APPARATUS
Filed April 7, 1958  6 Sheets-Sheet 1

Oct. 2, 1962 G. BRUN 3,056,355
HYDRAULIC APPARATUS
Filed April 7, 1958 6 Sheets-Sheet 3

Oct. 2, 1962 G. BRUN 3,056,355
HYDRAULIC APPARATUS
Filed April 7, 1958 6 Sheets-Sheet 6

United States Patent Office 3,056,355
Patented Oct. 2, 1962

3,056,355
HYDRAULIC APPARATUS
Georges Brun, Paris, France, assignor to Societe d'Etudes et d'Exploitation du Generateur a Piston Libre, Paris, France
Filed Apr. 7, 1958, Ser. No. 726,803
Claims priority, application France Apr. 8, 1957
12 Claims. (Cl. 103—126)

The present invention relates to hydraulic apparatus for use as pumps or transmissions.

It is known that a gear pump comprises essentially a pair of meshing gears which are rotatably received in the bicylindrical bore of a casing with very fine clearances as well between the faces of their teeth and the walls of surrounding coaxial bores, as also between the end faces of the gears and the adjacent walls of the casing.

The intake and discharge openings communicate with the bicylindrical bore at the opposing sides of the plane common to the axes of rotation of both gears. In this manner, liquid is transported from the side at which the teeth of gears move out of mesh to the side at which the teeth are again brought into mesh with each other.

In the majority of gear pumps now in actual use, the gears resemble conventional spur gears, i.e. with such number of teeth that the two gears rotating in opposing directions have at least two points of contact with each other. Thus, the gears are in actual mesh whereby only a single gear must be actually driven, the other being rotated by the driven gear. In other words, the gear pumps of known construction comprise an idler gear and a drive gear. The disadvantage of such construction is in that the efficiency and output are relatively low for the following reasons:

It has been shown that radial pressures as well as frictional losses and output losses increase as the number of teeth on the idle and drive gears increases. Also, the above losses are increased if the working depth of the teeth decreases, i.e. if the addendum of the teeth is reduced. These drawbacks in the gear pumps of known construction have been partially overcome by reducing the number of teeth and by increasing the addendum of the intermeshing teeth on both gears.

Furthermore, the liquid entrapped between the rotating gears is compressed between the roots and the faces of intermeshing teeth, and generates substantial radial pressures which increase proportionally with the decrease in clearance between the gears themselves on the one hand, and between the gears and the surrounding casing on the other hand. In order to reduce such pressures, the tolerances must be increased accordingly, which again entails considerable losses in output and liquid transfer of the pumping apparatus. For the above reasons, the known gear pumps generally operate with an efficiency of less than 80 percent.

It has now been found that the above disadvantages of conventional pumping devices can be overcome by still further reducing the number of teeth on each gear to such an extent that the two gears have no more but a single contact therebetween. Of course, such assemblies are incapable of transmitting rotation from one to the other of said gears, and a separate gear drive must therefore be provided to rotate the shafts on which the gears, hereinafter called impellers, of the pump are mounted.

This improved system has a great number of very important advantages which more than compensate for a slightly more complicated construction. For example, since the impellers are not required to be in actual mesh, i.e. they need not rotate each other, the number of their teeth, hereinafter called lobes, can be reduced to two, and thus the output of the pump, determined by the area between the consecutive teeth of each impeller, increased accordingly.

The present invention is based on the recognition that a pump embodying the above principle will operate with a superior efficiency, and provides a hydraulic apparatus comprising essentially one or more pairs of impellers each having two lobes of predetermined configuration. Such impellers are now employed in the so-called Root's type compressors used exclusively in connection with aeriform media for operation at relatively low pressures, as they were believed to be impractical for delivery of liquids.

An important object of the invention is to provide an improved hydraulic apparatus for conveying of liquids at variable and often very high pressures, the apparatus being utilizable as a gear pump or a transmission, and being of simple construction, of low weight, cheap in manufacture, and having an output considerably higher than that of devices of known construction utilized for similar purposes.

The invention resides essentially in the provision and various applications of a hydraulic pump or transmission which, in its elementary form, consists of a casing, a pair of parallel shafts in said casing, at least one impeller having a pair of lobes on each of said shafts received for rotation in a bicylindrical chamber in the casing, and means for balancing the radial and preferably axial stresses to which the impellers and their shafts are subjected during the liquid pumping operation. Various other features of my invention reside in the specific construction and configuration of the impellers; in various combinations of one or more novel apparatus with other devices; in specific construction of driving means for the shafts; in various control valves and their combination with the novel apparatus when the latter acts as a speed transmission; and many others which will become apparent and will be pointed out in full detail in connection with the following description of certain embodiments selected for illustration in the accompanying drawing, in which:

Figure 1:
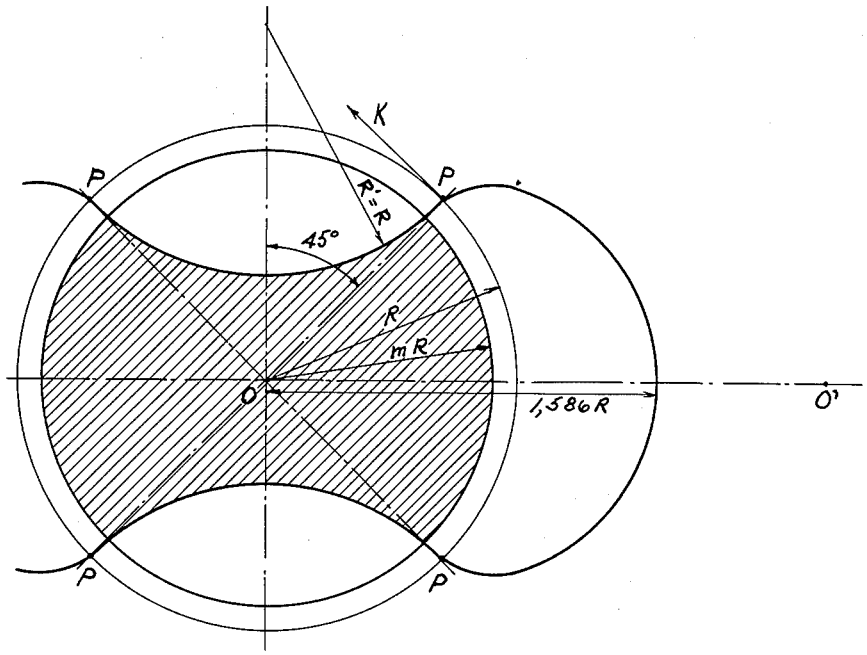
FIG. 1 illustrates in partial section and partially broken away one form of the impeller.

Referring now in greater detail to the illustrated embodiments, and first to FIG. 1, the impeller therein shown comprises a pair of lobes extending beyond the pitch circle whose radius is indicated at R, and of a convex configuration, the impeller further comprising a median portion which is integral with its shaft. The four points P shown on the pitch circles are ninety degrees apart. The outermost point of a lobe in radial direction from the impeller's axis O is at a distance equaling 1,586 R. This radial length of the lobe should be as great as possible, i.e. it should preferably greatly exceed the pitch radius R. O' indicates the axis of the second shaft which is not illustrated in this figure. The radius mR of the impeller's shaft, too, should be as great as possible, i.e. it should closely approach the pitch radius R. As above stated, the impeller should be integrally formed with its shaft. The area between points P,P within the pitch circle is preferably, but not necessarily, limited by a pair of surfaces of circular cross sectional contour with radius $R'-R$, which allows for convenient machining and finishing of the impeller's surfaces. The tangents KP and OP preferably enclose an angle closely approaching ninety degrees.

Figure 2:
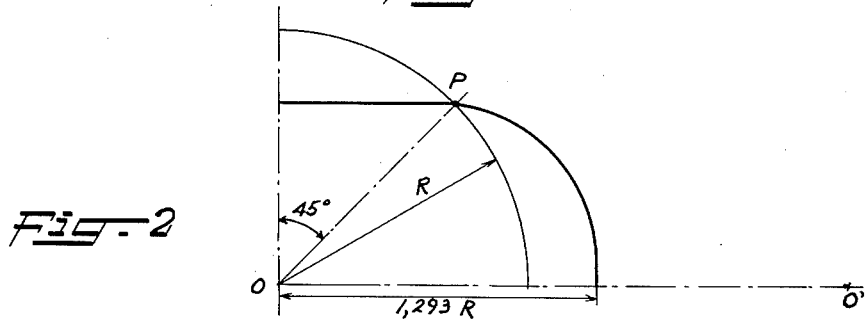
FIG. 2 illustrates the contour of a modified impeller particularly suitable for use when the apparatus operates at very high pressures.

When the apparatus operates at very high pressures and the impeller rotate at very high speeds, the latter should preferably be of a configuration shown in FIG. 2. Thus, the sides of the impeller within the pitch circle are parallel to each other, and the maximum radial length of the lobes is considerably less than the embodiment of FIG. 1 (1,293 R).

Figure 3:
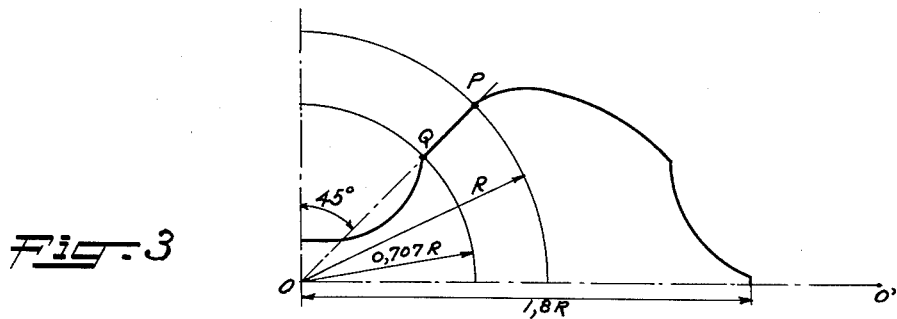
FIG. 3 shows a further modification of the impeller's configuration.

The novel apparatus, if operating at low pressures and utilized in connection with liquids of low viscosity, may advantageously employ impellers of configuration shown in FIG. 3. The portion of impeller within the pitch circle is formed by a radial surface PQ and a concave surface OQ. The radial length of the lobe is considerably greater than that of impellers shown in FIGS. 1 and 2 (1,8 R).

All above described configurations of the impeller's lobes and its median portions within the pitch circle, of course, are so calculated that the two impellers which rotate with respect to each other have a single point of contact during any full-circle revolution thereof.

The systems for balancing the stresses to which the impellers and their shafts are subjected by a liquid under various pressures are illustrated in FIGS. 4 to 8.

When a Root's type compressor is employed for conveying of liquid materials, the pressures exerted against the impellers present a considerable problem, this having been the basic reason for non-utilization of such compressors in liquid pumps and the like. The pressures may be divided into radial and axial pressures acting against the peripheral and end surfaces of an impeller, respectively. While the radial pressures are considerably smaller than the tangential stresses developing in gear pumps of known construction, they nevertheless reach such magnitudes that the conventional ball or other types of bearing cannot be employed if the apparatus is to operate with sufficient safety.

The novel construction shown in FIGS. 4 to 7 effectively balances such radia stresses by the provision of suitable channels and recesses in the shaft of each impeller on the one hand, and in the bearing portions of the pump casing on the other hand. In this manner, the pressures acting against the impellers at one side of their common axial plane are fully or at least partially compensated for by substantially equal pressures acting against the impellers' shafts at the other side of said plane. In other words, the liquid intake openings of the pumping apparatus communicate by means of suitable conduits with the recesses provided on the opposing sides of the shafts on the one hand, and the liquid discharge openings communicate with suitable recesses provided in the shafts at the other side of the plane passing through the axes of the impellers' shafts on the other hand. Therefore, the liquid pressures acting against the peripheral surfaces of the impellers in the bicylindrical chamber or chambers of the pump casing are compensated for by equal liquid pressure acting against the impeller shafts from the opposing side of the plane passing through the axes of the impellers.

Figure 4:
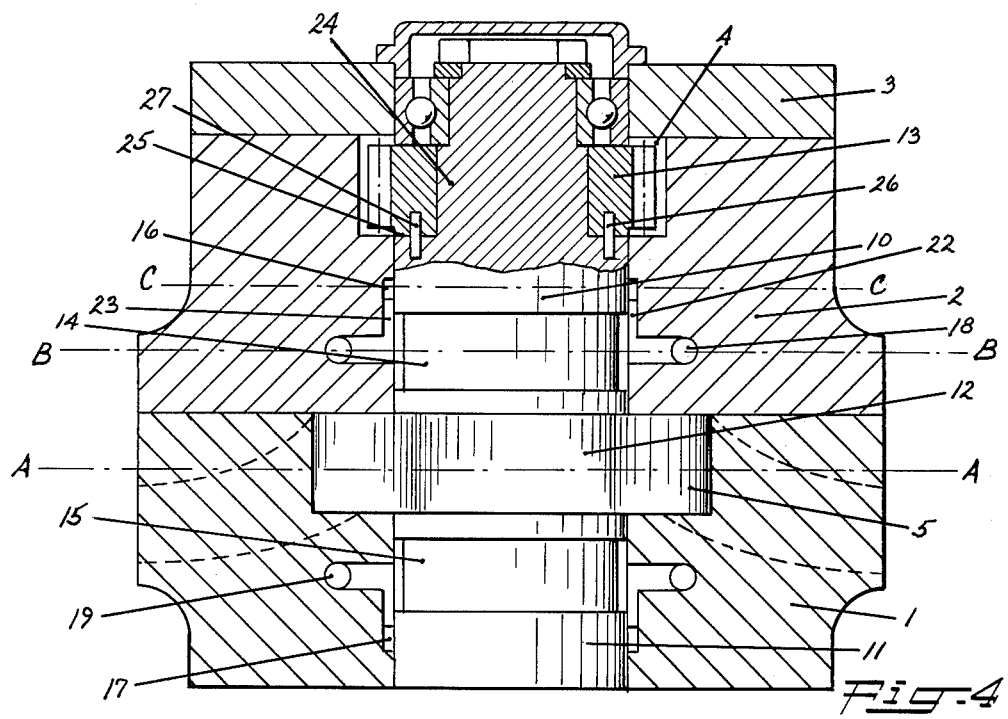
FIG. 4 illustrates the elementary form of the improved apparatus in axially parallel section taken on line X—X of FIG. 5.

FIG. 4 illustrates the pumping apparatus in its elementary form, that is, a single unit consisting of a suitably shaped casing 1, 2, 3; a pair of shafts each integrally formed with an impeller 12, 12', respectively; and driving gears, one for each of the shafts, of which one is shown in FIG. 4 mounted on the shaft of impeller 12.

The casing or stator of the pumping apparatus consists of three sections. Section 1 is provided with inlet and discharge openings 9, 8, respectively (see FIG. 5), which communicate with the bicylindrical chamber 5 consisting of portions 6, 7. Openings 8, 9 are disposed at the opposing sides of the plane common to the axes of impeller shafts.

Section 2 houses the driving gears for the shafts, while the section 3 serves as a cover or lid.

Figure 5:
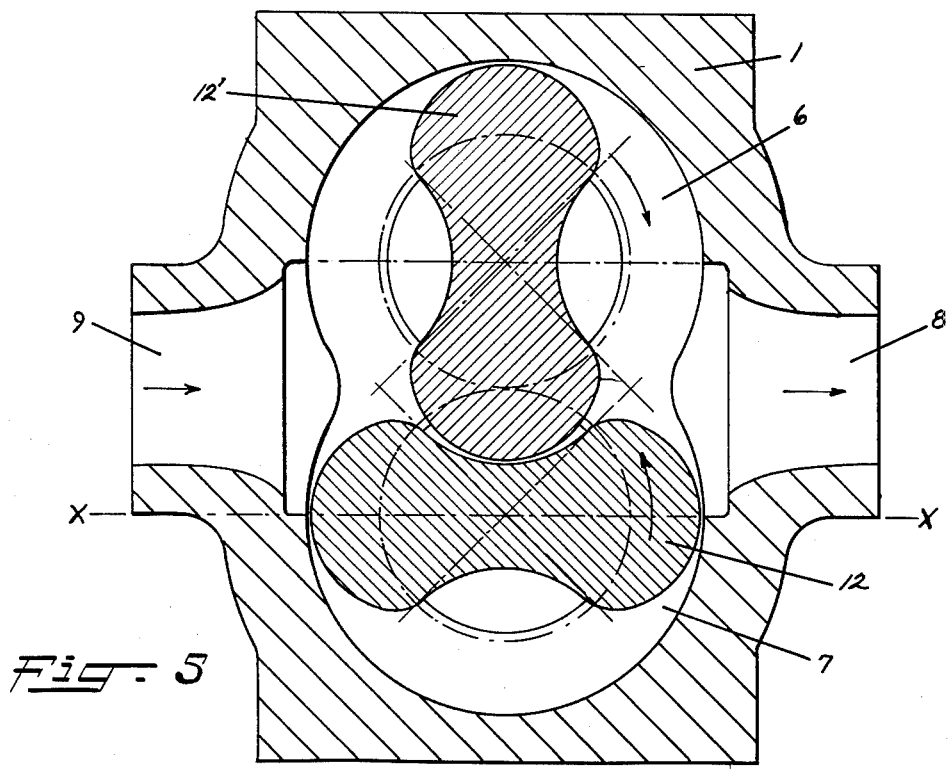
FIG. 5 is a section taken at right angles to the axis of the apparatus along line A—A of FIG. 4.

The three casing or stator sections 1 to 3 define a pair of axially parallel bores whose axial distance equals the diameter of the pitch circle, as is best shown in FIG. 5. These bores are enlarged into a first bicylindrical recess 4 in stator section 2 for reception of drive gears (only gear 13 shown in FIG. 4), and into the second bicylindrical recess or chamber 5 which, as above mentioned, comprises a pair of cylindrical portions 6, 7 in section 1 to receive the impellers 12, 12', the latter of a configuration very similar to that shown in FIG. 1.

As best illustrated in FIG. 4, shaft portions 10 and 11 are integrally machined with impeller 12. The shaft of impeller 12' is of identical construction. The driving gear or pinion is a separate element which is held on the reduced portion 24 adjacent to the shaft section 10 means of retaining elements or pins 26, 27. Shaft sections 10 and 24 define a shoulder 25 therebetween against which the adjacent end face of pinion 13 abuts. The (in FIG. 4) upper end of the shaft is received in suitable bearings of known construction and each bore in the stator section 3 is closed by a cap or the like.

Portion 10 of the shaft for impeller 12 is formed with a pair of nearly semicircular recesses 14 in its peripheral zone adjacent to the end faces of the lobes of impeller 12. Similar recesses 15 are provided in the peripheral zone of shaft portion 11. The shaft of impeller 12' is of identical construction as may be observed in FIG. 6. The recess in shaft portions 10, 11 are separated by relatively narrow peripheral ribs 10' best illustrated in FIG. 6, the ribs extending in directions parallel with the axes of impellers 12, 12'. The axis of symmetry X—X of each impeller intersects the ribs of its shaft. These ribs actually constitute narrow smooth peripheral zones of said shafts and are snugly received in the respective bores of the surrounding casing or stator assembly 1–3.

Figure 7:
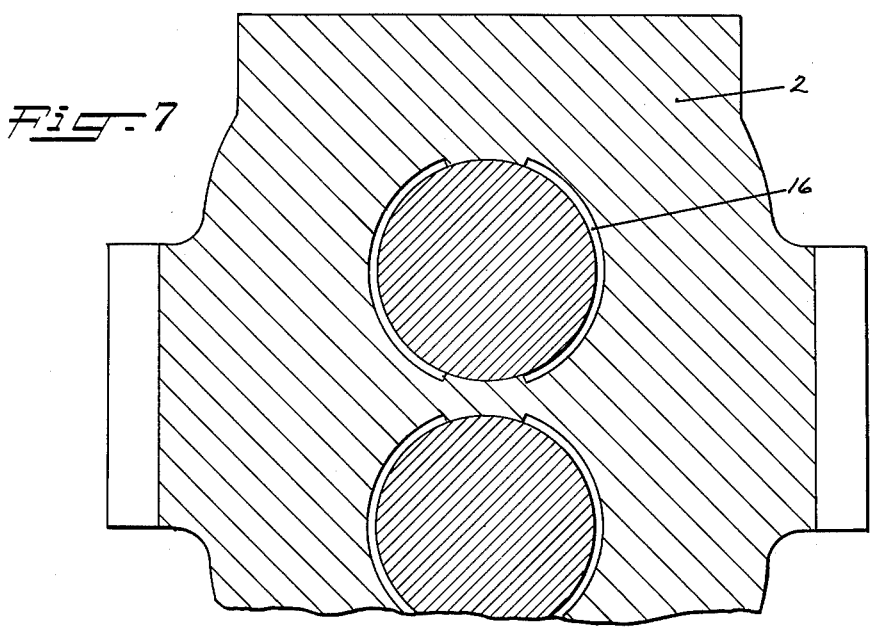
FIG. 7 is a further section taken on line C—C of FIG. 4.

Stator section 2 is formed with a pair of nearly semicircular recesses 16 in each of its two axial bores, and similar recesses 17 are provided in the stator section 1. Recesses 16 are shown in FIGS. 4 and 7.

Figure 6:
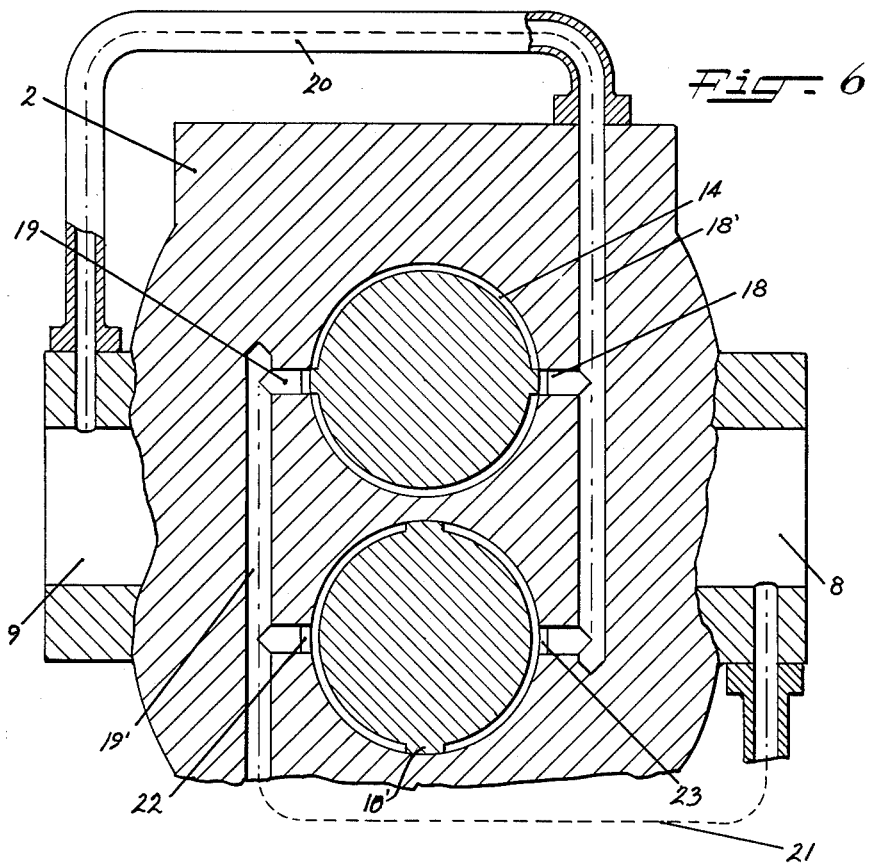
FIG. 6 is a section parallel to that of FIG. 5 and taken on line B—B of FIG. 4.

The manner in which recesses 14 in the impeller shafts are connected with respective intake and discharge openings 9, 8 is best shown in FIG. 6. Radial channels 18, 19 communicate with the bores for impeller shafts in casing section 2 on the one hand, and with similar channels 18', 19' on the other hand. The latter are in communication with conduits 20, 21 leading to openings 9, 8, respectively. The path of liquid flow in conduits 20, 21, and channels 18, 19 and 18', 19' is shown in broken lines.

Connection between the bores 18, 19 and semicircular recesses 16 is established by axially parallel grooves 22, 23 provided in the stator section 2 (see FIG. 4). The communicative connection between openings 9, 8 and the respective recesses 15, 17 within the casing section 1 is analogous.

It will now clearly appear that the liquid pressures acting against the peripheral surfaces of impellers 12, 12' also act against the shafts of said impellers in opposing directions.

The axial length of rotating recesses 14, 15 in the impeller shafts, and that of stationary recesses 16, 17 in the stator sections 1, 2 is so selected that the sum of radial stresses to which the shafts and their impellers 12, 12' are subjected during each revolution approaches or equals zero.

Also, the maximum residual pressures acting upon the rotor assembly should be as small as possible. The latter constitute but a small fraction of the radial pressures acting against each individual impeller.

It will be understood that the specific configuration of recesses 14 to 17, of bores 18, 19, 18', 19', of grooves 22, 23 and conduits 20, 21 was given merely by way of example as they may assume other, more complicated shapes, if desired and necessary. It is, for example, possible to reduce the areas and depths of recesses 14 to 17 which would leave some radial pressures without compensation. Such arrangement may become desirable under certain circumstances as it reduces the amplitudes of oscillations of the rotors' axes even though these amplitudes are generally rather low even when the radial pressures acting upon the rotor assembly are fully compensated for in the above described manner.

When the impellers of configuration shown in FIG. 2 are employed, the recesses 16 and 17 in stator sections 1 and 2 may be omitted.

The above described construction of the rotor and stator assembly constitutes the essential feature of the present invention. Thus, the impellers are integral with their shafts, they have two lobes of the configurations described or similar thereto, and means is provided for nearly or fully balancing any radial stresses that arise when the impellers are in operation. It may be stated here that the impellers of configuration shown in FIG. 1, i.e. whose concave surfaces within the pitch circle are of circular cross sectional contour with the radius substantially equaling the pitch radius, may be employed under practically all circumstances wherever the improved hydraulic apparatus is put to use.

Due to considerable pressures and great angular velocities often arising in the operation of the novel apparatus, the interior of the stator sections 1 to 3 should preferably be hardened and coated with a ceramic, with bronze, chromium or other wear resistant material. Similarly, the surfaces of the impeller shafts will be hardened or otherwise finished to insure long use and satisfactory resistance to wear and tear.

Instead of forming the stator in three or even more sections, it may be assembled of two halves joined only along the common axial plane of impellers 12, 12' shown in FIG. 5. This, however, complicates the manufacture of such stator halves to an extent rendering the construction less desirable. This is even more apparent when each shaft comprises two or more impellers, as will be described hereinafter in connection with FIGS. 9 to 11 and 13. Axial and radial adjustments are more complicated if the casing is made of two halves only, and such construction further requires that the impeller shafts be of smaller diameters. As above stated, it is desirable for reasons of safety, particularly against shearing stresses, that the diameter of each impeller shaft approach the pitch diameter as closely as possible. Therefore, the stator preferably consists of a plurality of sections, as shown in FIG. 4, i.e. the sections are divided from each other in planes disposed at right angles to the axes of impeller shafts and connected by axially parallel bolts or the like which are not illustrated. Each section comprises a pair of axially parallel bores as is shown in FIGS. 6 and 7.

Figure 8:
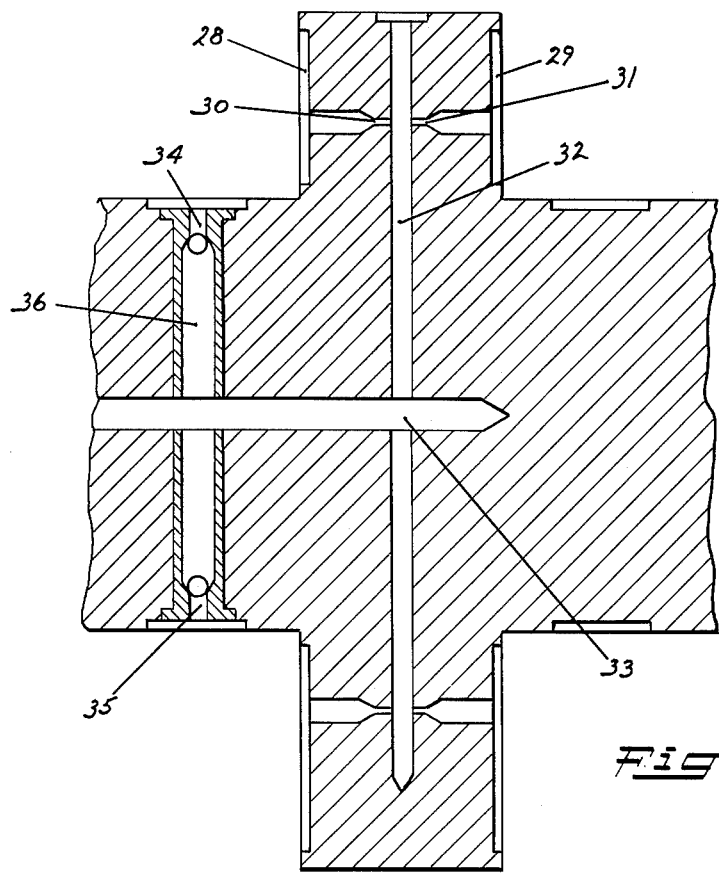
FIG. 8 is an enlarged longitudinal section in the axial plane of an impeller showing the system for balancing axial stresses to which an impeller may be subjected.

FIG. 8 illustrates a system for balancing axial pressures to which the impellers, and more particularly their lobes, are subjected. This system allows for centering of the impellers 12, 12' in their respective bores or chamber portions 7, 6. It is well known that the end surfaces of gears in gear pumps and the adjacent surfaces of the casing present the weaker points of the pumping system because these surfaces are parallel and thus cannot be lubricated in an automatic manner. Even slight axial stresses may cause abutments of an impeller against the adjacent walls of the pump casing which can result in jamming and increase the backflow of conveyed liquids in addition to causing considerable friction. Moreover, one must consider internal axial stresses arising in the impellers which are caused by a secondary elastic deformation of their lobes. Owing to improper engagement and mounting, the impellers may become twisted about their central axial planes which results in displacements of certain impeller surfaces with respect to the walls of stationary casing 1. This again may cause axial displacement of the impellers and consequent differences in pressure between their end faces. On further rotation of so displaced or inclined impellers, the axial displacements and inclination will automatically increase to such extent that a friction between the plane surfaces of the casing in its bicylindrical chamber and the impeller surfaces may result in actual jamming of the rotor assembly.

The section of FIG. 8 is taken in the axial plane of impeller 12 along line X—X shown in FIG. 5. The end faces of impeller's lobes define shallow recesses or basins of such dimensions as to leave only narrow marginal portions of the lobes in close tolerance with respect to the adjacent parallel walls surrounding the bore 7 in the pump casing sections 1 and 2. The surfaces of the impeller's lobes in respective recesses 28, 29 would normally be subjected to two different pressures tending to axially displace the entire rotor assembly consisting of the impeller and its shaft. However, by providing axially parallel passages 30, 31 whose innermost reduced portions communicate with a bore 32, the pressures at both sides of the impeller's lobes are equalized and all torsional stresses in axial direction prevented. The impeller is automatically centered by the provision of a coaxial bore 33 which communicates with bore 32 and also with a transverse conduit 36 whose terminals are normally closed by a pair of ball valves 34, 35. The reduced ports at the outer ends of conduit 36 communicate with semicircular recesses 14 and/or 15 provided in the peripheral zones of shaft sections 11, 10, respectively, and thus establish a connection with the inlet opening 9 as well as well the discharge opening 8 of the pump casing. It will thus be seen that any differences in axial forces acting against opposing parallel surfaces of the impeller's lobes are immediately and fully equalized by the provision of recesses 28, 29 and connecting passages 30, 31; and also that the pressures exerted in radial directions, during rotation of an impeller and its shaft, are immediately conveyed to the interior of an impeller over recesses 14, 15, valves 34, 35, conduit 36, and bores 32, 33 in that order. A uniformity of pressure acting against all surfaces of the impeller and its shaft is thus attained, and the rotor assembly is free to actually float in the bicylindrical chamber of its casing or stator assembly.

Figure 9:
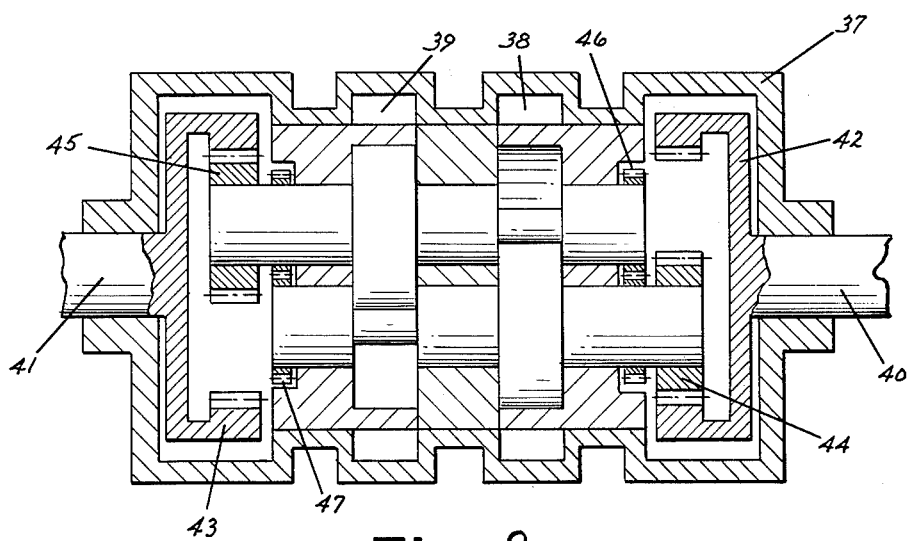
FIG. 9 illustrates a modified apparatus mounted in a housing together with means for driving the impeller shafts.
Figure 10:
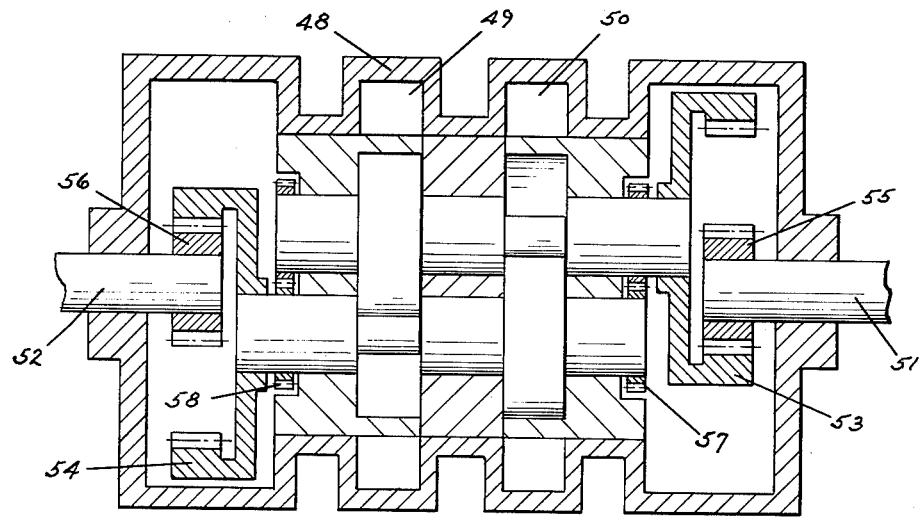
FIG. 10 is a section in the axial plane of impeller shafts and illustrates a slight modification of the drive means shown in FIG. 9.
Figure 11:
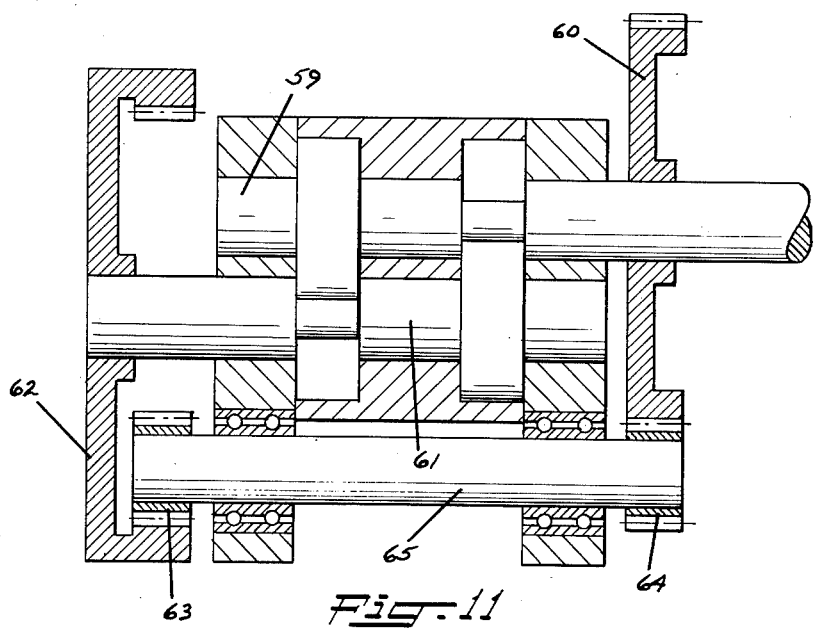
FIG. 11 illustrates in section a still further modification of the drive means.

FIGS. 9 to 11 illustrate various arrangements for synchronizing the angular movements of impellers and their shafts. It has already been mentioned hereinabove that the pumping apparatus of this invention requires separate drive means since the construction of impellers automatically eliminates any driving connection therebetween. In other words, one of the impellers cannot and should not have more than a line contact with the other impeller (see FIG. 5) which, of course, is insufficient to impart rotary motion to one of the shafts even though the other shaft may be driven. It is, in fact, highly desirable that the impellers be so installed as to avoid any pressures between their surfaces, since such pressures of stresses may cause considerable friction or even jamming of the machine.

The surfaces of the impellers, their shafts and the walls of the pump casing in its bores and chambers are precision finished and the rotor assemblies, i.e. the shafts with their impellers, are centered with great accuracy to avoid all undesirable pressures between the impellers themselves, or between the peripheral and end surfaces of the impellers and the surrounding walls of the casing.

Rotary motion is imparted to the impellers and their shafts by drive means consisting of gear trains of various types, depending on many specific requirements and circumstances under which the improved assembly is put to us, for example as a pump or a hydraulic transmission. It is extremely important to so synchronize the rotational movements of impellers and their shafts, i.e. of each rotor, that the impellers are maintained out of mutual contact despite variations in pressure, flow of liquid or any other operating conditions. The relative motions of the impellers may be described as interdigitating movements.

The capacity of gear trains which drive the impeller shafts depends on a number of differing circumstances.

Such capacity may be relatively low when each shaft carries two impellers and the two shafts must be driven in opposing directions, i.e. when the machine delivers liquid to a pair of receptors. When the receptor is an electric machine, each shaft may be driven by a separate electric motor and the two motors are so coupled that the shafts are driven in opposing directions but at identical speeds. Other possible uses of such two-impeller rotor assemblies are in hydraulic drives, hydraulic turbines operating at low pressures, rolling mills, and some other apparatus. In the receptors of such types, it is relatively easy to avoid any energy transfer between the shafts; it is sufficient to connect each shaft with a driven axle and to displace the two impellers on each shaft through ninety degrees from each other.

In FIGS. 9 and 10, the stators or casings of the pump assemblies are free to rotate about their own axes within stationary housings 37, 48, respectively. The latter are provided with annular channels 38, 39 and 49, 50, respectively, the ones under high and the others under low pressures, to supply the liquids to the apparatus.

The axles 40, 41 shown in FIG. 9 and 51, 52 of FIG. 10 are coaxial with the axes of housings 37, 48, respectively. Axles 40, 41 carry internal gears 42, 43 meshing with pinions 44, 45, respectively. It will be noted that the gears 42 to 45 permit displacement of axes 40, 41 with respect to the axes of impellers and their shafts within the sectional stator in housing 37 a distance equaling exactly the length of the impellers' pitch radius. If it is desired to drive the impellers at a velocity greater than that of receptors' axles 40, 41, the ends of impellers' shafts, according to FIG. 9, are rotatably connected by relatively small pinion pairs 46 and 47.

It will be noted that the impellers on each of the two shafts are displaced through an angle of ninety degrees with respect to each other.

In FIG. 10, the internal gears 53, 54 are mounted on impeller shafts to mesh with planetary gears 55, 56 on receptors' axles 51, 52, respectively. Driving connection between the ends of parallel impeller shafts in established by pinion pairs 57, 58, respectively. It will be noted that the impellers in FIG. 10 are driven at angular speeds below those of axles 51, 52.

FIG. 11 illustrates the modification according to which the rotor assembly consisting of two impeller shafts is connected to a single receptor. Rotor shaft 59, carrying two impellers disposed at right angles with respect to each other, is coaxially connected to a receptor (not shown) and carries a large cogwheel 60 meshing with a pinion mounted for rotation with an auxiliary shaft 65. Pinion 63 at the other end of member 65 meshes with an internal gear 62, the latter being fixed to the other impeller shaft 61. Again, the angular velocities of shafts 59 and 61 are fully synchronized by proper selection of gears 60, 62 and of pinions 63, 64 on auxiliary shaft 65.

A very important application of the novel apparatus is as a variable speed transmission, especially hydraulic transmission which normally should be of the variable speed type. For example, a driving machine is connected with a receptor over a transmission means incorporating one or more apparatus constructed in accordance with the instant invention. The driving machine rotates the impellers of a first assembly operating as a pump. The latter thereupon drives a second assembly of similar construction which acts as a motor for the receptor. By varying the output of the novel apparatus intermediate the driving machine and the receptor, the velocity of the latter may be changed within any desired range. The ratio of velocities between driving machine and the receptor is inversely proportional to the ratios of output of the intermediate assemblies.

Figure 13:
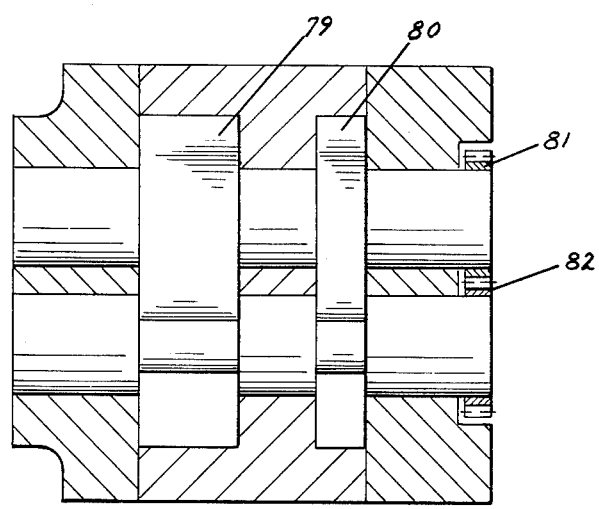
FIG. 13 illustrates a still further modification of the improved apparatus with impeller units of different axial lengths.

If the novel assemblies, coupled between the driving motor and the receptor, each comprise two units, i.e. two pairs of impellers mounted in a casing as shown in any of FIGS. 9 to 11, and further if the apparatus are of the type shown in FIG. 11, that is, being connected to a single axle, the inlet and discharge ports of their casings may be controlled by independently, for example, hydraulically adjustable regulators permitting to stop or to vary the flow of liquid to any selected impeller unit. Moreover, it is also possible to use impeller units of different axial lengths in a single apparatus, as is illustrated in FIG. 13, and to so connect the various input and discharge openings with one another as to again control the output of the novel apparatus. This, in turn, varies the angular velocity of the receptor connected to such a device, the latter thus acting as a multi-speed transmission. However, if the novel system is such as shown in FIGS. 9 and 10, that is, connected to two axles, the axial length of the respective impellers must be uniform and they cannot be adjusted independently.

Figure 12:
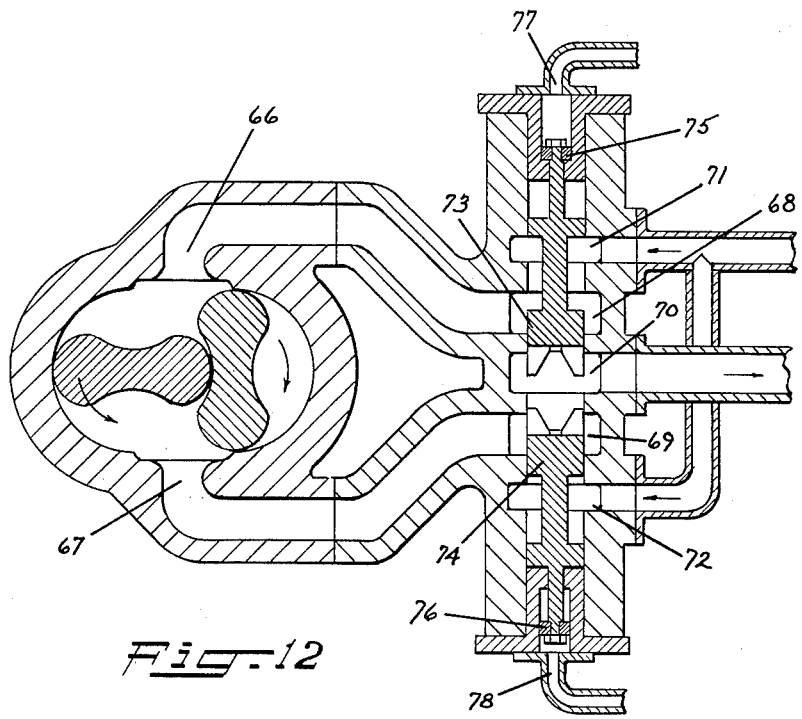
FIG. 12 is a section taken in a plane at right angles to the impellers' axes showing a system of valves for controlling the flow of liquid to and from the bicylindrical chamber in the pump casing.

The regulators for controlling the single units of apparatus according to this invention may be of a number of different constructions and designs. A preferred embodiment of such regulating devices is shown in FIG. 12. The discharge and inlet ports 66, 67, respectively, of a single unit comprising a pair of impellers of the type shown in FIGS. 1 and 5 are communicatively connected with chambers 68, 69, respectively, provided in a housing connected to the casing of impellers' shafts. A chamber 70, disposed between chambers 68, 69 is connected to a source of liquid at low pressure. Chambers 71, 72, also in communicating relationship with chambers 68, 69, are connected to a source of liquid under high pressure. The passages between chambers 70, 68, 71 on the one hand, and chambers 70, 69 and 72 on the other hand, are controlled by a pair of slide valves 73, 74. The latter members are displaceable by a hydraulic system acting against their pistons 75, 76, respectively, each disposed in a cylinder inserted in the regulator housing. Under the action of high pressure liquid in chambers 71, 72, the valve elements 73, 74 are permanently urged in directions away from low pressure chamber 70. Such movements of these valves may be controlled by the pressure of liquid introduced into the cylinders of pistons 75, 76 through the respective channels 77 and 78.

In one position, the valves 73, 74 are moved all the way in outward direction away from the central low pressure chamber 70 and thus connect inlet and discharge openings 67, 66 with said low pressure chamber 70. In another position, the valve members are moved in inward direction toward the chamber 70 under the pressure of a liquid introduced into the cylinders of their respective pistons 75, 76 through conduits 77, 78, whereby the openings 66, 67 are connected with high pressure chambers 71 and 72.

When the opening 66 is connected to high pressure chamber 71 and the other opening 67 communicates with low pressure chamber 70 (see the position of valve elements 73, 74 shown in FIG. 12), the impellers rotate in the directions indicated by the arrows.

When the opening 66 is connected with chamber 70 and the other opening 67 communicates with the high pressure chamber 69, the direction of rotation of the impellers is inverted.

The machine is arrested when both orifices or openings 66, 67 are connected to low pressure chamber 70.

Another way of varying the speed of a receptor connected with a driving machine over a transmisison embodying one or more assemblies according to the instant invention is to further modify the latter in accordance with the illustration of FIG. 13. This embodiment comprises a pair of units 79 and 80, each consisting of two impellers, the axial lengths of impellers 79 being different from those of impellers 80. Angular movements of the impeller shafts are synchronized by gears 81, 82. This regulator turns freely as it is not connected to a receptor.

The impeller assembly 79 is traversed by a flow of liquid whose pressure should be regulated. Two valves (not shown in FIG. 13) are employed in a manner analogous to that shown in FIG. 12. One of the valves controls the inlet of unit 80 and the other valve its discharge orifice. The first valve is adapted to connect the inlet of impeller unit 80 with the inlet of impeller unit 79 (first position) or with a fluid under low pressure (second position). The other valve can connect the discharge of impeller unit 80 with the discharge of unit 79 (first position), or with a low pressure fluid (second position). If the ratio of axial length of impeller units 80 and 79 is indicated by $x$, and if it is further assumed that the first valve is in its first position and the second valve in its second position, the pressure of liquid is increased by $1+x$, while the outflow is reduced by $1+x$. When the first valve and the second valve are in their second and first positions, respectively, the pressure of liquid (e.g. oil) is reduced by $1+x$, and the outflow increased by $1+x$.

When both valves are simultaneously in their first or second positions, the pressure and flow of liquid remain unchanged. The simple regulator of FIG. 13 thus allows for three different speeds. The number of different speeds may be increased by adding consecutive regulators similar to that of FIG. 13, or by using three-unit regulators with the third unit of an axial length different from those of the other two impeller units. Moreover, the two-unit speed regulator of FIG. 13 may be combined with a three-unit assembly, if desired.

It will be understood that certain of the elements described above, or two or more together, may also find a useful application in other types of pumps or transmissions differing from the types described above.

It will also be understood that any adaptations of the present invention, such as may occur to persons skilled in the art, are intended to be comprehended within the meaning and range of equivalence of the appended claims.

What is claimed and desired to be secured by Letters Patent is:

1. A hydraulic apparatus for conveying liquids at high pressures comprising, in combination, a casing defining at least one bicylindrical chamber with an inlet opening and a discharge opening for entry and discharge of a liquid, respectively, said discharge opening constituting the high pressure side of the apparatus; a pair of axially parallel shafts having respective journal portions rotatably received in said casing and each having an impeller in said chamber, each of said impellers constituting an integral part of the respective shaft, each comprising a pair of lobes in meshing engagement with the lobes of the other impeller along a pitch circle when said shafts rotate, the diameter of said pitch circle being not substantially greater than the diameter of the journal portions of the corresponding shaft, each impeller having a predetermined clearance with the other impeller and with said casing, respectively; means for driving said shafts at synchronized angular speeds including intermeshing gear means mounted on the shafts; and means for balancing the radial stresses against said shafts comprising conduit means communicating with said inlet opening and substantially semi-circular recesses formed between said shafts and said casing and communicating with said conduit means for communicatively connecting said inlet opening with the side of each shaft facing away from said inlet opening, and conduit means communicating with said discharge opening and substantially semicircular recesses formed between said shafts and said casing in communication with said last mentioned conduit means for connecting said discharge opening with the sides of said shafts facing away from said discharge opening, said first and last mentioned recesses being separated by planes passing through the axes of said shafts, and each extending circumferentially substantially 180° around a corresponding journal portion, and extending axially substantially the axial length of said corresponding journal portion.

2. The combination according to claim 1, wherein the lobes of said impellers are formed with substantially axially parallel passages and with recesses in their end surfaces communicatively connected by said passages, each passage further communicating with the high pressure side of said apparatus for equalizing the axial stresses acting against the opposing end surfaces of the impellers.

3. A hydraulic apparatus for conveying liquids at high pressures comprising, in combination, a casing having a pair of parallel axial bores defining at least one bicylindrical chamber, an inlet opening in said chamber at one side of the plane common to the axes of said bores, and a discharge opening in said chamber at the other side of said plane, said casing further defining a plurality of bearing portions respectively surrounding each of said bores, adjacent to said chamber and each having a pair of substantially semicircular recesses therein separated by said plane; a pair of shafts in said bores, each shaft having a peripheral zone journaled in a respective one of said bearing portions, said zone being formed with at least one pair of substantially semicircular recesses therein, said shaft having an impeller in said chamber, the recesses in one shaft being turned through 90 degrees with respect to the recesses in the other shaft, each impeller having a pitch diameter equal to the distance between the axes of said shafts and substantially equal to the diameter of the peripheral zone of the corresponding shaft, each impeller comprising a pair of lobes, each of said lobes having a pair of parallel end surfaces and a median portion constituting an integral part of the respective shaft; means for driving said shafts at equal angular velocities in opposing directions including intermeshing gear means mounted on said shafts; and means for balancing radial stresses to which said shafts are subjected when rotated and a liquid passes between said inlet and discharge openings in said chamber, said last mentioned means including first conduit means for connecting said inlet opening with one of the recesses in each bearing portion and in the peripheral zone of each shaft, and second conduit means for connecting said discharge opening with the other of the recesses in each bearing portion and in the peripheral zone of each shaft.

4. The combination according to claim 3, wherein the median portion of each of said impellers in said chamber is bounded by a pair of concave surfaces of circular cross sectional contour.

5. The combination according to claim 3, wherein said casing has a plurality of bicylindrical chambers and the impellers in each of said chambers are of uniform axial lengths.

6. The combination according to claim 3, wherein said casing has a plurality of bicylindrical chambers and the impellers in said chambers are of different axial lengths.

7. The combination according to claim 3, wherein said casing has a pair of bicylindrical chambers and each of said shafts comprises a pair of impellers, one in each of said chambers, said impellers of each of said shafts being disposed at right angles with respect to each other.

8. The combination according to claim 3, wherein the means for driving said shafts further comprises an internal gear fixed to one of said shafts; an auxiliary shaft having a first gear meshing with said internal gear and a second gear; a sprocket fixed to the second of said shafts and meshing with said second gear; and means for rotating said last mentioned shaft.

9. The combination of claim 3, wherein the median portions of each of said impellers are bounded by a pair of parallel surfaces.

10. The combination according to claim 3, wherein the means for driving said shafts, further comprises a housing for rotatably receiving said casing; a first axle in said housing; a first operative connection between said first axle and one of said shafts; a second axle in said housing; and a second operative connection between said second axle and the other of said shafts.

11. The combination according to claim 10, wherein each of said operative connections comprises an internal gear fixed to said first axle and to said last mentioned shaft, respectively, and a planetary gear fixed to said first mentioned shaft and to said second axle, respectively.

12. The combination according to claim 11, wherein the pitch diameters of said planetary gears are equal to the pitch diameters of said impellers.

References Cited in the file of this patent

UNITED STATES PATENTS

| | | |
|---|---|---|
| 18,986 | Palmer | Dec. 29, 1857 |
| 713,342 | Phifer | Nov. 11, 1902 |
| 984,811 | Hanson et al. | Feb. 21, 1911 |
| 1,035,385 | Pearsall | Aug. 13, 1912 |
| 1,132,747 | Sundh | Mar. 23, 1915 |
| 1,361,423 | Waterous | Dec. 7, 1920 |
| 1,379,587 | Fisher | May 24, 1921 |
| 1,795,579 | Storey | Mar. 10, 1931 |
| 2,212,994 | Vrolix | Aug. 27, 1940 |
| 2,319,374 | Ungar | May 18, 1943 |
| 2,360,833 | Hammond | Oct. 24, 1944 |
| 2,522,824 | Hicks | Sept. 19, 1950 |

FOREIGN PATENTS

| | | |
|---|---|---|
| 515,521 | France | Nov. 26, 1920 |
| 633,905 | Germany | Aug. 10, 1936 |
| 1,170,967 | France | Sept. 29, 1958 |